United States Patent [19]

Pinger et al.

[11] Patent Number: 4,539,457

[45] Date of Patent: Sep. 3, 1985

[54] METHOD OF MANUFACTURING GRATINGS AND APPARATUS FOR CARRYING OUT THE METHOD

[75] Inventors: Egon Pinger, Penzberg; Jan W. Stapelmann, Meerbusch, both of Fed. Rep. of Germany

[73] Assignee: Staco Stapelmann GmbH, Kaarst, Fed. Rep. of Germany

[21] Appl. No.: 558,774

[22] Filed: Dec. 6, 1983

[30] Foreign Application Priority Data

Dec. 7, 1982 [DE] Fed. Rep. of Germany ....... 3245179

[51] Int. Cl.³ ..................... B23K 11/02; B23K 11/32
[52] U.S. Cl. ...................................... 219/58; 219/56; 219/87
[58] Field of Search ................... 219/56, 58, 79, 87

[56] References Cited

U.S. PATENT DOCUMENTS

| | | | |
|---|---|---|---|
| 2,957,070 | 10/1960 | Schächter et al. | 219/56 |
| 3,727,038 | 4/1973 | Ritter et al. | 219/58 X |
| 4,125,753 | 11/1978 | Ritter et al. | 219/56 |
| 4,360,724 | 11/1982 | Ritter et al. | 219/58 |
| 4,468,550 | 8/1984 | Gott et al. | 219/56 |

FOREIGN PATENT DOCUMENTS 2617696 11/1977 Fed. Rep. of Germany .

Primary Examiner—Roy N. Envall, Jr.
Assistant Examiner—C. M. Sigda
Attorney, Agent, or Firm—Toren, McGeady, Stanger, Goldberg & Kiel

[57] ABSTRACT

In the continuous manufacture of gratings in which transverse bars (8) are welded at intervals to continuous longitudinal bars (15) which are subsequently cut to obtain the required length gratings, the positioning of the transverse bars (8) at the welding station (3) by a transverse bar holder (4) and the advancement of the longitudinal bars after each welding step by an advancing mechanism (5) is controlled by a computer so as to control the spacing between the transverse bars as necessary to produce gratings of the required length and in which, after cutting, the ends of the longitudinal bars will project by predetermined amounts (preferably equal) at opposite ends of the gratings, and the transverse bars are evenly spaced at a pitch which is within a predetermined tolerance of a predetermined basic pitch.

18 Claims, 7 Drawing Figures

METHOD OF MANUFACTURING GRATINGS AND APPARATUS FOR CARRYING OUT THE METHOD

This invention relates to a method of manufacturing, preferably continuously, gratings consisting of longitudinal supporting bars and transverse bars welded thereto so that the spacing of the transverse bars is substantially uniform and within predetermined spacing limits, and so that the longitudinal bars project at each end by uniform, predetermined amounts. The invention also relates to apparatus for carrying out the method.

Methods of manufacturing gratings from individual cut to length longitudinal and transverse bars or from continuous longitudinal supporting bars and cut to length transverse bars are known. German specification No. 26 17 696 describes a method in which the transverse bars are endlessly drawn each from a coil and are fed to a welding apparatus parallel to each other and at a spacing corresponding to the required transverse bar pitch, and the support bars are individually fed to the welding apparatus transversely to the feed direction of the transverse bars. In this and other known methods, the longitudinal support bars are pressure-welded by the welding apparatus to the transverse bars, producing a grating sheet which is then cut by means of shears or a saw at spacings corresponding to the required grating sizes, possibly taking into account the width of any edge bars. Since the grating dimensions and the transverse bar pitch are determined completely independently of each other, it can arise that the cutting position of the grating sheet coincides with a bar or comes so near to a bar that it is no longer possible to apply cutting shears at the intended cutting position. The grating sheet must then be cut at a different position, so that an over dimensioned or under dimensioned grating results, or an intermediate cut is necessary in the region of the head end of the grating sheet, i.e. in conjunction with the preceding cut, which leads to a piece of waste material. Cutting in the plane of a transverse bar is possible by means of a saw, but the transverse bar is wasted having regard to the width of cut of the saw blade, for example 6 mm. This is an unnecessary wastage of material and is accompanied by high wear of the saw blade. A further disadvantage lies in the fact that the cutting plane can shift from one grating to the next in respect of the mutually adjacent end bars, if, for example, the length of the grating is not a whole multiple of the transverse bar pitch. This leads not only to different projecting lengths of the support bars at the two ends of a grating but also on opposite sides of the cutting plane, i.e. from one grating to the next, in spite of constant and uniform grating dimensions. The consequence of this is that, after the gratings have been laid, the transverse bars will not be in alignment with one another, and a correspondingly non-uniform placing pattern results.

Added to this is the fact that, depending upon the position of the cutting plane between the end bars of adjacent gratings in a grating sheet, the projecting lengths of the support bars are smaller than admissible from the predetermined pitch and accordingly the mass and number of the transverse bars is greater than for a grating having the maximum admissible projecting lengths of the support bars.

The aforementioned disadvantages occur in the welding of the transverse bars to the longitudinal supporting bars either singly or multiply, e.g. in pairs, because in both cases the transverse bar pitch is predetermined by the intended application of the grating, as also are the dimensions of the grating, although the dimensions are determined completely independently of the transverse bar pitch according to the area to be covered by the gratings, i.e. according to the local circumstances. The grating dimensions can vary widely depending upon the area to be covered, although according to experience approximately 70% of gratings of a layout plan constitute groups of gratings all having the same dimensions.

The aim of the present invention is to provide a method and apparatus by which gratings can be manufactured in which the projecting length of the longitudinal support bars at each end of the grating is uniform from one grating to the next, and is preferably the same at both ends.

The solution to this task is based upon the idea of adjusting the spacing of the transverse bars within a predetermined acceptable tolerance each side of the basic pitch so that for each grating of a group, or indeed for several grating groups, the transverse bars are evenly spaced and a uniform length of the longitudinal support bars projects at each end of the grating, and preferably using the largest possible transverse bar pitch, without departing from the acceptable tolerance, whenever possible. The sum of the tolerance permissible at each transverse bar spacing functions as a buffer, which permits equal projecting lengths of the support bars to be attained and the number of transverse bars to be kept as low as possible.

According to the invention therefore, a method of manufacturing gratings consisting of longitudinal support bars and transverse bars welded thereto at substantially equal intervals and so that the longitudinal bars project at each end comprises positioning and welding the transverse bars at least one at a time to a plurality of longitudinal bars, advancing the longitudinal bars with the welded transverse bars after each welding step, and controlling the positioning and advancing steps by a computer so as to control the spacing between successive transverse bars such that, for a grating of a predetermined length, the transverse bars are substantially evenly spaced at a pitch which is within a predetermined tolerance of a predetermined basic pitch and the longitudinal bars project at each end by a predetermined amount, and if the manufacture involves any loss of material due to cutting of the longitudinal bars such loss will be taken into account in controlling the transverse bar spacing.

In the case where the transverse bars are positioned and welded two at a time, the computer controls the spacing so that the required grating has an even number of transverse bars, the computer first determining the number of transverse bars which the grating would have if spaced at the predetermined pitch and, if the number is uneven, selecting either a larger or a smaller pitch, within the predetermined tolerance, such that the grating is formed with either one less or one more transverse bar.

The transverse bar spacing may be within a predetermined tolerance of, for example, plus or minus 5% of the predetermined basic pitch, and selection of the pitch in this range enables the production of gratings, possibly with the omission of one or more transverse bars, in which the projecting lengths of the longitudinal bars is uniform from one grating to the next. The omission or the addition of one transverse bar is, in the case of transverse bars welded in pairs, unavoidable where the number of bars which would be needed at the basic pitch is uneven. On the other hand the omission of a pair of transverse bars guarantees a minimum of transverse bar mass and thus an extremely economical manufacture. Moreover, the consumption of welding energy is lower and higher productivity results.

In determining the number of transverse bars and the spacings for a given length of grating, the computer preferably assumes the bars to be arranged symmetrically about the centre of the longitudinal bars, ensuring that equal projecting lengths are obtained at the ends of the grating.

In the case where the transverse bars are positioned and welded one at a time, the computer selects the spacing by determining the number of transverse bars which the grating would have if spaced at the predetermined pitch, determining if the required grating could be made with one or more less bars by increasing the pitch within the predetermined tolerance and, if not, selecting the pitch necessary to obtain the required grating.

In this method, a minimum mass of transverse bars is obtained only if the acceptable spacing tolerance can be used so that one or more transverse bars is omitted. If by exhausting the increasing spacing tolerances a grating cannot be obtained having the specified projecting lengths of the longitudinal bars at its ends, including any cutting losses, then the transverse bar pitch must be decreased within the permissible tolerance, possibly such that one additional transverse bar must be introduced.

Although, in the method in accordance with the invention, uniformity of the projecting lengths of the longitudinal bars amongst gratings is of prime importance the method is preferably also carried out in such a way that the smallest possible mass of transverse bars is used within that which the specifications or the client permits. The transverse bar pitch tolerance should, therefore, be used to increase the pitch as much as possible and whenever possible. In other words the computer preferably controls the transverse bar spacing so that the spacing between the transverse bars of the required grating is as large as possible within the predetermined tolerance of the basic pitch.

The method in accordance with the invention also permits the projecting lengths of the longitudinal supporting bars to be adjusted according to the Client's wishes, for example to be increased in order to avoid the grating fouling the grating underlay or support. It may also be taken into account, in determining the distribution of the transverse bars, that transverse bars lying directly above the grating underaly or support do not form part of the structural system, and therefore missing out transverse bars in such regions does not constitute any weakening.

The advance (or stroke) of the grating after each welding step is normally equal to the actual transverse bar spacing determined by the computer, or a multiple thereof if more than one bar is welded at a time. After the welding of the end of a grating, the advance of the grating is different. It then corresponds to the sum of the projecting lengths of the longitudinal bars at the trailing and leading ends of the adjacent gratings, the length of any possible material loss which will occur during cutting by sawing, and the transverse bar spacing if two bars are welded at the same time. The projecting lengths of the two adjacent gratings may be the same or may be different, depending upon whether gratings of a group having equal or unequal projecting lengths of the longitudinal bars at opposite ends are involved or whether gratings from two different groups are involved.

According to a further aspect of this invention, apparatus for carrying out the method comprises a welding station, means for supporting a plurality of longitudinal bars at the welding station, a transverse bar conveyor, a transverse bar holder having at least one pair of holding jaws for receiving a transverse bar from the conveyor and adjustable in position at the welding station, means for advancing the grating from the welding station after a welding step, and a computer which is arranged to control the transverse bar holder and/or the grating advancing means so as to control the spacing between successive welded transverse bars such that, for a grating of a predetermined length, the transverse bars are substantially evenly spaced by a distance which is within a predetermined tolerance of a predetermined basic pitch and the longitudinal bars project at each end by a predetermined amount. By means of the adjustable holding jaws, before welding takes place, the distance of a transverse bar from its neighbour can be varied within the predetermined spacing tolerance having regard to the desired uniform projecting length of the longitudinal bars and possibly a minimum mass of transverse bars.

For the purpose of welding the transverse bars in pairs to the longitudinal bars, the transverse bar holder preferably comprises two pairs of holding jaws disposed on spindles which are arranged to be driven under the control of the computer to adjust the spacing between the two pairs of holding jaws and hence the spacing between two transverse bars held thereby. The spindles may possess a common drive or may be separately driven. It is important that the holding jaws which together grip one transverse bar are synchronously moved. The transverse bar holder may be traversable, or may be disposed in the welding station, wherein it is preferably capable of being lowered so that, after the transverse bars have been firmly clamped by welding electrodes onto the longitudinal bars, the holder may be protected during welding and also permit the advance of the grating sheet after welding.

The grating advancing means may comprise a longitudinally traversable pulling beam which is pivotal in a vertical plane and is arranged to engage a transverse bar of the grating sheet in order to move the sheet forwards after each welding step. In order to maintain the actual transverse bar spacing and apply braking action to the grating sheet, the apparatus may also possess a longitudinally traversable stop beam which is pivotal in a vertical plane and which functions as a transverse bar stop and, at the commencement of manufacture of a sheet or in the manufacture of individual gratings, also as a longitudinal support bar stop.

The apparatus may also comprise a longitudinally traversable cutting position marker which is controlled by the computer to mark on one of the longitudinal support bars the cutting positions necessary to separate the required gratings having the required projecting lengths from the sheet. This marking serves for initiating the subsequent cutting operation, for example by a saw or shears.

In the method in accordance with the invention, the transverse bars may be fed in the direction of advance of the grating sheet or transversely thereto, and may be placed upon the longitudinal support bars so that they project evenly at the sides of the grating and uniformly from one grating to the next, both in the case of individual bar welding and in the case of multiple bar welding. On the other hand, the method may also be carried out in such a way that, in special cases, the transverse bars project by different amounts on opposite sides of the grating, although each grating within the relevant group of gratings will be the same.

As mentioned earlier, the number, and hence mass, of transverse bars used in a grating is preferably kept to a minimum, in so far as the grating dimensions and specifications permits. This is particularly the case with fairly long lengths of grating, since then the permissible tolerances for the individual transverse bar spacings can add up to one or even several such spacings. For example, for a grating having a length of 1000 mm and a specified transverse bar pitch of 38.1 mm (centre/centre of the bars), the sum of the spacing tolerances is 43.7 mm, which if fully utilized will permit the omission of two transverse bars while maintaining the required grating parameters, thus leading to a considerable saving in material.

An example of apparatus in accordance with the invention, and of a method of manufacturing gratings using the apparatus, will now be described with reference to the accompanying drawings, in which.

Figure 1:
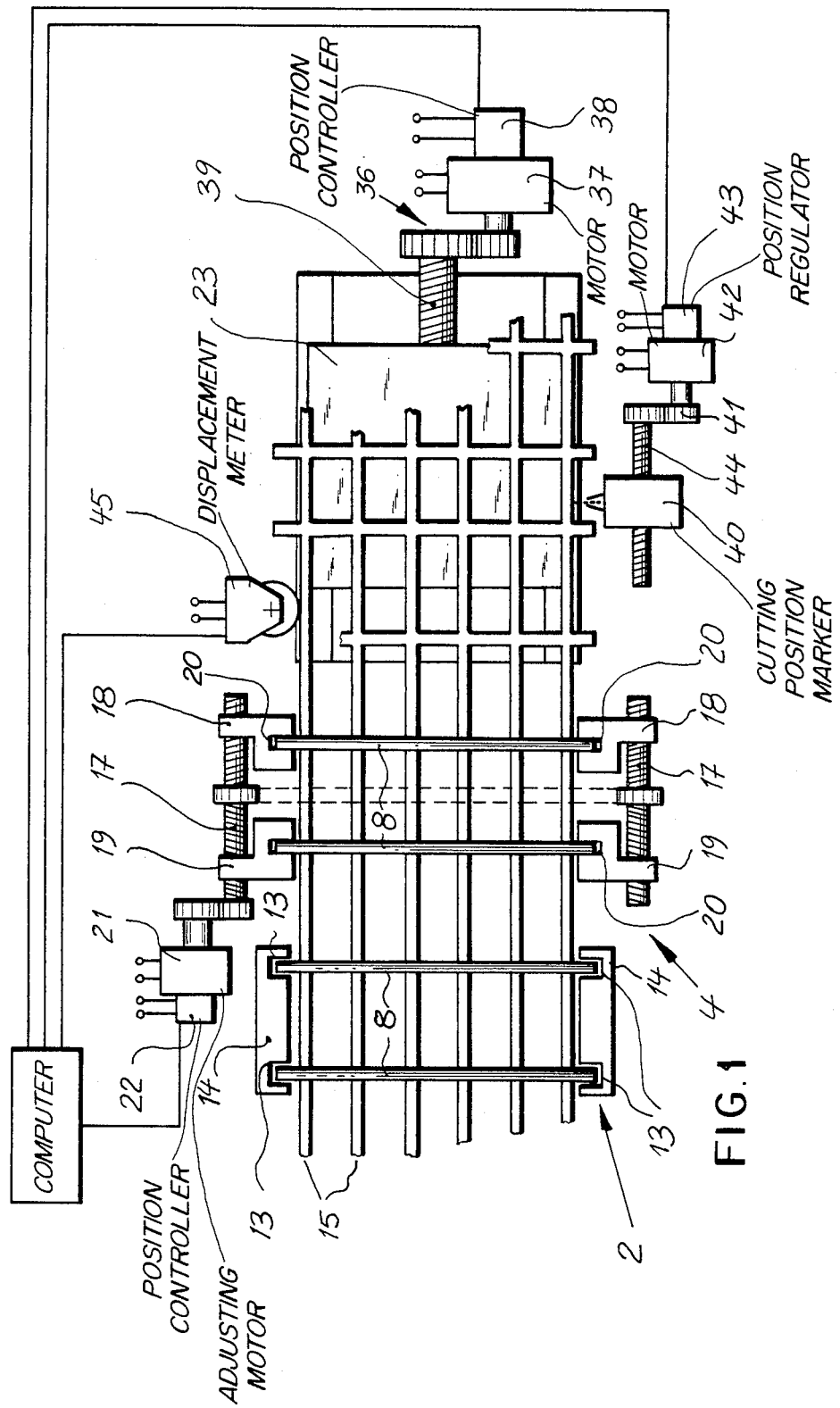
FIG. 1 is a plan view of part of the apparatus illustrating the manufacture of gratings in operation.
Figure 2:
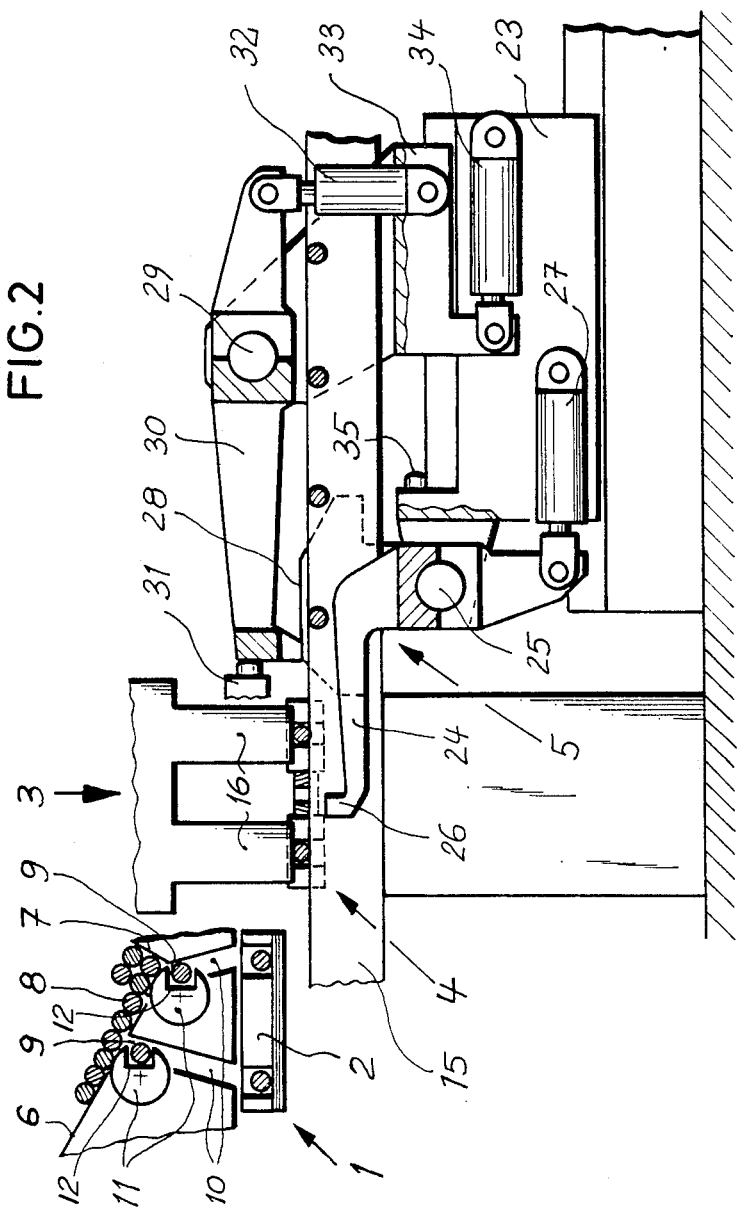
FIG. 2 is a vertical section through the apparatus shown in FIG. 1.

The apparatus illustrated consists essentially of a transverse bar conveyor comprising a transverse bar magazine 1 and a transverse bar trolley 2, a welding station 3, a transverse bar holder 4, and a grating moving device 5.

The transverse bar magazine 1 comprises an inclined support plate 6 with a retainer 7 for the cut-to-length transverse bars 8, and a pair of transverse bar openings 9 from which guide shafts 10 extend to the transverse bar trolley 2. In the region of the shaft openings 9, the magazine 1 has gripping rolls 11 with pockets 12 for singling out the transverse bars 8 and feeding them one at a time through the guide shafts 10 to the trolley 2. The trolley has holding portions 13 for receiving the transverse bars in carrier portions 14.

Beneath the transverse bar magazine 1, spaced continuous longitudinal support bars 15, each drawn from a coil (not shown), extend parallel through the welding station 3, which has two vertically movable welding beams 16. In the welding station 3 the transverse bar holder 4 is disposed beneath the welding beams 16, the holder consisting of two pairs of holding jaws 18, 19 disposed on two synchronously driven spindles 17 so that the two pairs of jaws can be moved towards or away from each other. The jaws have transverse bar seatings 20. The spindles 17 are drivingly connected with each other in a manner not illustrated in detail, and are driven through gears by an adjusting motor 21 which is controlled by a position controller 22 from a computer (not illustrated).

The grating moving device 5 is situated downstream from the welding station 3 and comprises a pulling beam 24 which is journalled to pivot in the vertical plane on a main slider 23 which is reciprocable in the longitudinal direction. The pulling beam is in the form of a two-armed lever pivotal about an axis 25, one arm of the lever forming a pulling hook 26, and the other arm of the lever being acted on by a pivoting cylinder 27. The main slider 23 possesses a skid face 28 for supporting a stop beam 30 in the form of a two-armed lever disposed above the plane of the grating and pivotal in the vertical plane about an axis 29. One end of the stop beam 30 serves as a transverse bar and longitudinal bar stop, while a lifting cylinder 32 acts upon the other end of the beam. Opposite to the free end of the stop beam 30 a safety stop 31 is disposed at the welding station 3 to prevent penetration of the stop beam into the welding station. Both the stop beam 30 and its lifting cylinder 32 are mounted on an auxiliary slider 33 which is displaceable longitudinally on the main slider 23 by means of a displacement cylinder 34 as far as a stop 35.

A spindle 39 driven via a gear 36 by a motor 37 having a position controller 38 controlled by the computer (not illustrated) serves as the drive for the main slider 23.

To one side of the grating moving device, the apparatus includes a cutting position marker 40 which is journalled on a spindle 44 driven via a gear 41 by a motor 42 with a position regulator 43 connected to the computer, for marking on one of the longitudinal bars the position where the bars are to be cut to separate the required grating from the sheet.

To the side of the grating moving device opposite the cutting position marker, the apparatus has a displacement meter 45 which measures the actual transverse bar spacing and compares it with the transverse bar spacing predetermined by the computer, in order to produce a subsequent spacing correction, if necessary, via the computer.

In operation the longitudinal support bars 15 are drawn from their coils and are fed on edge, parallel and at a predetermined transverse spacing from one another, to the welding station 3, and a pair of transverse bars 8 are selected by the gripping rolls 11 and caused to fall through the guide shafts 10 into the holding portions 13 of the transverse bar trolley 2. The trolley carries the pair of transverse bars 8 into the welding station 3 until they are above the transverse bar holder 4, and in this position the holding portions 13 open downwards so that the two transverse bars fall and their ends enter the seatings 20 of the two pairs of holding jaws 18, 19. The mutual spacing of the pairs of holding jaws 18, 19 is set by means of the adjusting motor 21 to a spacing determined by the computer for the grating under manufacture. This spacing can be modified in individual cases by means of the adjusting motor 21.

Immediately after the two transverse bars have been seated in the holding jaws 18, 19, the holder 4 descends simultaneously with the two welding beams 16 until the transverse bars 8 come to bear upon the longitudinal bars 15, whereupon the two transverse bars are pressure-welded to the longitudinal bars. The transverse bar trolley 2 returns to the transverse bar magazine 1 to collect two more transverse bars 8.

Figure 3:
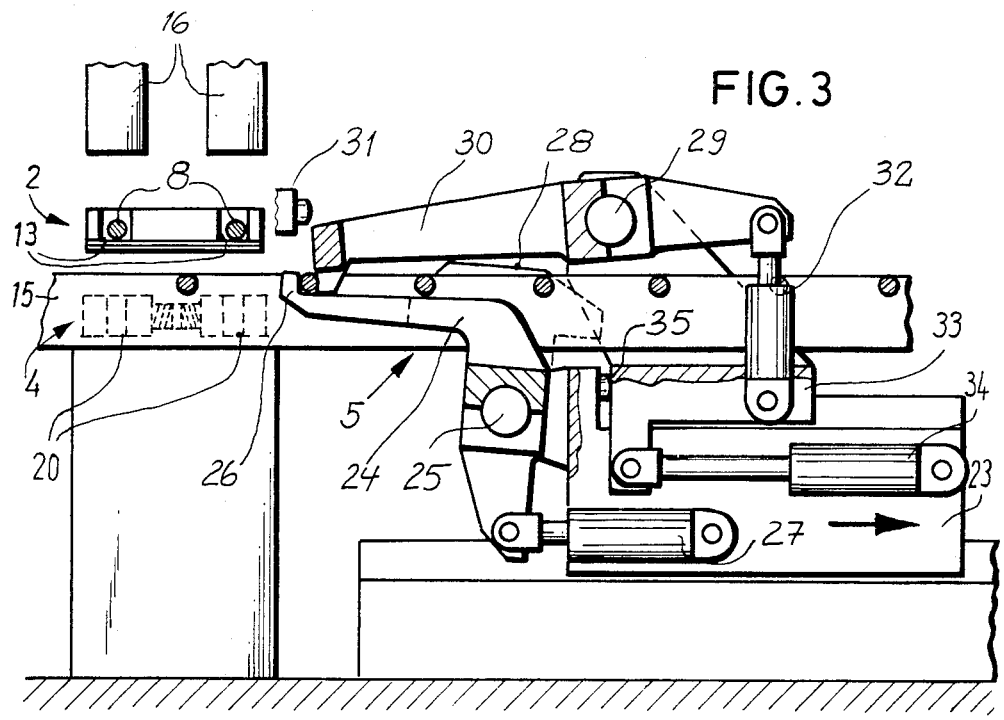
FIG. 3 is a view similar to that of FIG. 2 but showing the apparatus at a different stage in the manufacturing process.
Figure 4:
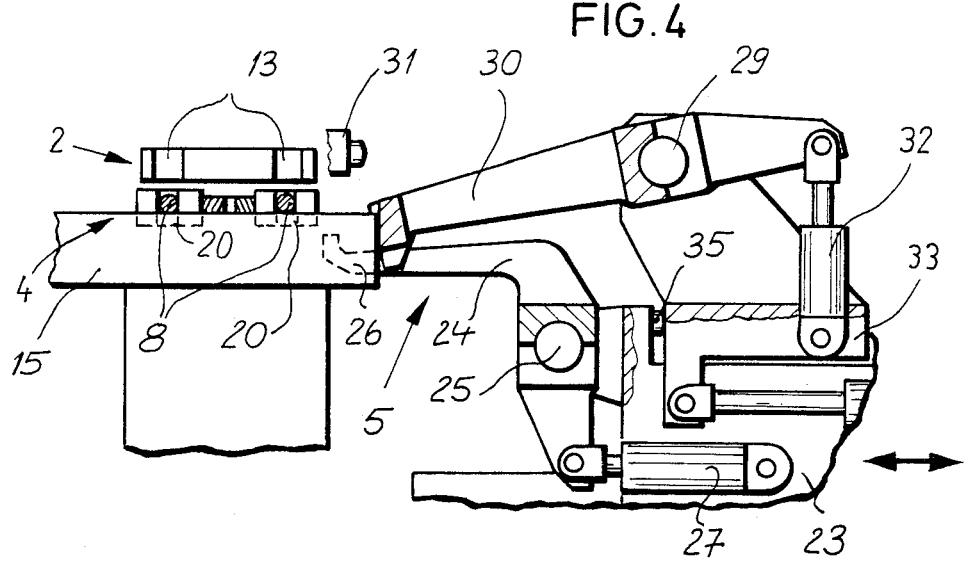
FIG. 4 is a vertical sectional view of part of the apparatus showing it at the commencement of manufacture.

After the welding of the two transverse bars, the welding beams 16 are raised and the pulling beam 24 is swung upwards, its pulling hook 26 being situated in the region of the grating opening between the two transverse bars just welded. The main slider 23 is then moved in the direction of advance of the grating sheet so that the pulling hook 26 engages the leading transverse bar of the just welded pair and pulls the grating sheet with it. Simultaneously the stop beam 30 slides over the skid face 28 into the working position which can be seen in FIG. 3. In this position, the stop beam 30 serves as a travel limiter for the forward movement of the grating sheet. The travel of the slider 23 between welding the transverse bars of a grating corresponds to twice the bar spacing, but when all the transverse bars of a grating have been welded, the stroke of the slider 23 changes depending on the sum of two projecting lengths of the longitudinal bars 15, i.e. the projecting length required on the just completed, but not yet cut to length grating and the equal or unequal projecting length required at the beginning of the next grating. The stroke of the slider thus corresponds to the sum of the transverse bar spacing, the two projecting lengths of longitudinal bars required on the two gratings, and any cutting loss when the gratings are separated.

When the bar grating sheet has reached this position, the transverse bar trolley 2 has once again returned to the welding station in order to feed the next pair of transverse bars 8 to the transverse bar holder 4.

Figure 5:
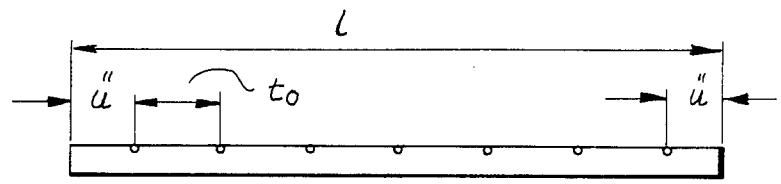
FIG. 5 is a side view of a grating having desired dimensions and the transverse bars spaced at a predetermined pitch ($t_o$)
Figure 6:
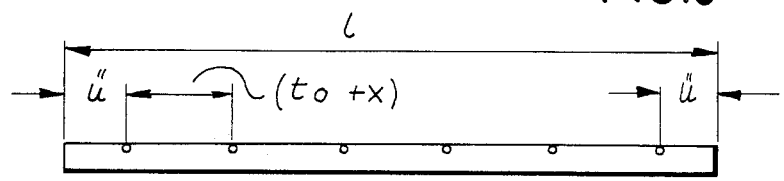
FIG. 6 is a side view of a similar grating produced with the apparatus by increasing the transverse bar pitch to ($t_o+x$)

In carrying out the method in accordance with the invention, the computer determines firstly, taking into account the predetermined length (l) of the required gratings and the predetermined basic pitch ($t_o$) for the transvese bars, the number of transverse bars needed for distribution along a grating at the basic pitch while leaving lengths of the longitudinal bars projecting at each end. If the number of transverse bars is even the computer determines what increase or decrease in the basic pitch is necessary, within predetermined tolerances $\pm(x)$, to obtain the required lengths of longitudinal bars projecting at each end. If, as in the case of FIG. 5, the number of transverse bars is uneven, the computer then determines if by increasing the transverse bar pitch within the predetermined tolerance $+(x)$ the required grating can be made with one less transverse bar. If not, the computer then determines if the required grating can be made with one further transverse bar by decreasing the pitch within the predetermined tolerance $-(x)$. FIG. 6 shows the case where the grating is achieved by an increase in spacing by the full tolerance (x) and the omission of one transverse bar, resulting in three pairs of transverse bars for welding at an actual transverse bar pitch ($t_o+x$), and equal lengths U" of longitudinal bars projecting at opposite ends of the grating for a loss-free cutting. In the case where cutting of the support bars to separate the grating from the sheet results in a loss of material, the projecting lengths must be increased accordingly to compensate.

Figure 7:
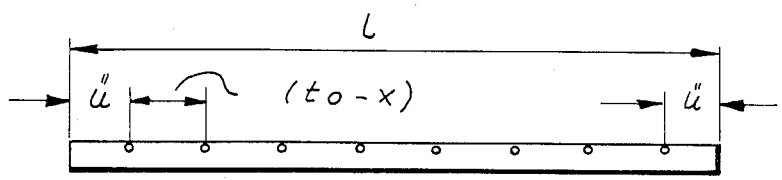
FIG. 7 is a side view of an alternative grating produced with the apparatus by decreasing the transverse bar pitch to ($t_o-x$).

FIG. 7 shows the case where the grating is achieved by reducing the transverse bar spacings to ($t_o-x$) and adding one further transverse bar. Since in this case four pairs of transverse bars have to be welded, not only is the mass of the grating larger (for the same grating dimensions) than those of FIGS. 5 and 6, but also one further welding cycle is necessary and the manufacture of the grating is accordingly more costly. There remains, however, the important advantage of equal projecting lengths of the support bars at corresponding ends of such gratings manufactured.

If apparatus is used in which the transverse bars are welded singly, the method in accordance with the invention is simplified in that gratings may be made with an even or an uneven number of transverse bars. Starting from the situation illustrated in FIG. 5, the computer only needs to adjust the transverse bar pitch ($t_o$) within the tolerance $\pm(x)$, either reducing the pitch, possibly with the addition of one further transverse bar, or increasing the pitch, possibly with the omission of one transverse bar, until the predetermined projecting lengths of the longitudinal bars and, where applicable, including cutting losses, will be obtained.

We claim:

1. A method of continuously manufacturing gratings comprising longitudinal support bars and transverse bars welded thereto at substantially equal spacings along the longitudinal support bars and wherein said longitudinal bars project at each end beyond the adjacent transverse bar, said method including the steps of providing a plurality of longitudinal support bars spaced laterally apart, positioning and welding transverse bars at least one at a time to said plurality of longitudinal bars at a stationary welding station while maintaining said longitudinal and transverse bars stationary, advancing said longitudinal bars with said welded transverse bars after each welding step for a given longitudinal spacing until the next at least one transverse bar is in the welding station and stopping the movement of said longitudinal bars, providing computer control means, and controlling said positioning and advancing steps by said computer control means so as to control the spacing between successive transverse bars whereby, for a grating of a predetermined length, said transverse bars are substantially evenly spaced at a pitch which is within a predetermined tolerance of a predetermined basic pitch and said longitudinal bars project at each end by a predetermined amount from the adjacent said transverse bar.

2. A method as claimed in claim 1, wherein positioning and welding said transverse bars two at a time, and controlling with said computer control means said positioning and advancing steps for controlling said transverse bar spacing after first determining a number of transverse bars which a grating of said predetermined length would have if said transverse bars were spaced at said predetermined pitch and, if said number is uneven, selecting one of a larger and a smaller pitch, within said predetermined tolerance, whereby said grating is formed with either one less or one more transverse bar and thereby has an even number of said transverse bars.

3. A method as claimed in claim 1, wherein positioning and welding said transverse bars one at a time, and controlling with said computer control means said positioning and advancing steps for controlling said transverse bar spacing after determining a number of transverse bars which a grating of said predetermined length would have if said transverse bars were spaced at said predetermined pitch, determining if the required grating could be made with at least one less transverse bar increasing said transverse bar pitch within said predetermined tolerance and, if not, selecting the transverse bar pitch value necessary to obtain said required grating.

4. A method as claimed in claim 1, including the steps of measuring the actual spacing between successive welded transverse bars, and adjusting by said computer control means said positioning and advancing steps so as to compensate for any deviation of said measured actual spacing from said pitch selected by said computer control means.

5. A method as claimed in claim 1, wherein operating said computer control means to select said transverse bar pitch to be as large as possible within said predetermined tolerance of said basic pitch consistent with obtaining said required grating.

6. A method as claimed in claim 1, wherein selecting said predetermined amount by which said longitudinal support bars project at opposite ends of said required grating from the adjacent transverse bar so that the predetermined amount is the same at the opposite ends.

7. A method as claimed in claim 6, wherein controlling said advancing step after welding of a last of said transverse bars on said required grating to be twice said predetermined amount by which said longitudinal bars project at each end plus cutting losses, if any.

8. Apparatus for continuously manufacturing gratings consisting of longitudinal support bars and transverse bars welded thereto at substantially equal spacings along the length of the support bars, and wherein said longitudinal bars project at each end from the adjacent transverse bar, said apparatus including a welding station, means for supporting a plurality of laterally spaced longitudinal support bars at said welding station, a transverse bar conveyor spaced from said welding station, a transverse bar holder having at least one pair of holding jaws for receiving a transverse bar from said conveyor and being adjustable in position at said welding station, means for advancing the grating from said welding station after a welding step, and computer control means for controlling the position of said holding jaws and said grating advancing means so as to control the spacing between successive welded transverse bars whereby, for a grating of a predetermined length, said transverse bars are substantially evenly spaced by a spacing distance which is within a predetermined tolerance of a predetermined basic pitch and said longitudinal bars project at each end by a predetermined amount from the adjacent said transverse bar.

9. Apparatus as claimed in claim 8, wherein said transverse bar holder comprises two pairs of spaced said holding jaws, spindles mounting said two spaced pairs of holding jaws for movement towards and away from each other, and means for driving said spindles under the control of said computer control means for adjusting the spacing between said two pairs of holding jaws and hence the spacing between two transverse bars held thereby.

10. Apparatus as claimed in claim 8, wherein said transverse bar holder is disposed at said welding station.

11. Apparatus as claimed in claim 10, including means for lowering the said transverse bar holder below a welding level.

12. Apparatus as claimed in claim 8, wherein said transverse bar conveyor comprises a transverse bar magazine for holding a plurality of said transverse bars, and a transverse bar trolley for carrying transverse bars from said magazine to said transverse bar holder.

13. Apparatus as claimed in claim 12, wherein said transverse bar magazine includes at least one discharge shaft, and a feed roll associated with each said discharge shaft for delivering a transverse bar from said magazine through said discharge shaft to said trolley.

14. Apparatus as claimed in claim 8, wherein said longitudinal bars extend horizontally, said grating advancing means comprises a pulling beam mounted for pivotal movement in a vertical plane and means for traversing said pulling beam in the longitudinal direction of said longitudinal bars.

15. Apparatus as claimed in claim 14, including a grating stop beam mounted for pivotal movement in a vertical plane, and means for traversing said stop beam in said longitudinal direction of said longitudinal bars.

16. Apparatus as claimed in claim 8, including a cutting position marker, and means for traversing said marker in said longitudinal direction of said longitudinal bars under the control of said computer control means to mark the position where said longitudinal bars are to be cut to obtain said required grating.

17. A method of continuously manufacturing gratings consisting of longitudinal supporting bars and transverse bars extending across the longitudinal supporting bars, with a constant, predetermined projecting length of the support bars from the transverse bar adjacent to an end of the grating and predetermined spacing tolerance of the transverse bars, characterized therein by establishing with a computer, taking into account a predetermined length of grating and basic pitch, a number of transverse bars necessary for the grating, distributing the transverse bars according to the basic pitch along the grating length, if the number of transverse bars is an uneven number and increases the transverse bar spacing within the tolerance, taking into account the basic pitch and the predetermined projecting length including any cutting losses at the ends of the support bars, so that one transverse bar is omitted, or decreases the transverse bar spacing so that a further transverse bar is necessary or, if the number of transverse bars is an even number separates out two end bars and/or distributes the transverse bars according to the basic pitch and at least partially using up the tolerance, that the predetermined projecting length including the cutting losses at the support bar end is obtained and also positioning a transverse bar holder and controlling a grating removal device in accordance with the ascertained actual bar spacing and the current projecting length including any cutting losses.

18. A method of continuously producing pressure-welded gratings consisting of longitudinal support bars and transverse bars extending across the longitudinal support bars, having a constant, predetermined support bar projecting length from the adjacent transverse bar and predetermined spacing tolerance for the transverse bars, characterized therein by establishing with a computer, taking into account a predetermined length of grating and basic pitch of the transverse bars, a number of transverse bars necessary for the grating, distributing the transverse bars according to the basic pitch along the length of the grating, for increasing the transverse bar spacing, taking into account the basic pitch and the pretermined projecting length including any cutting losses within the tolerance, so that one transverse bar is omitted, or reducing the transverse bar spacing so that one further transverse bar is necessary, and also positioning a transverse bar holder and controlling a grating removal device according to the ascertained actual bar spacing of the transverse bars and the current projecting length of the ends of longitudinal support bars from the adjacent transverse bars and including any cutting losses.

* * * * *